US008516790B2

(12) United States Patent
Hogie

(10) Patent No.: US 8,516,790 B2
(45) Date of Patent: Aug. 27, 2013

(54) SPRING FOR A CASCADE-TYPE THRUST REVERSER SHUTTER FOR AN AIRCRAFT JET ENGINE

(75) Inventor: Jean-Paul Hogie, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 273 days.

(21) Appl. No.: 12/674,212

(22) PCT Filed: Jun. 18, 2008

(86) PCT No.: PCT/FR2008/000844
§ 371 (c)(1),
(2), (4) Date: Feb. 19, 2010

(87) PCT Pub. No.: WO2009/024658
PCT Pub. Date: Feb. 26, 2009

(65) Prior Publication Data
US 2011/0266366 A1 Nov. 3, 2011

(30) Foreign Application Priority Data

Aug. 20, 2007 (FR) ..................................... 07 05893

(51) Int. Cl.
F02K 3/02 (2006.01)
F02K 1/54 (2006.01)
B05B 12/00 (2006.01)

(52) U.S. Cl.
USPC .................. 60/226.2; 244/110 B; 239/265.25

(58) Field of Classification Search
USPC ....... 60/226.2, 230; 244/110 B; 239/265.19, 239/265.23, 265.27, 265.29, 265.31
See application file for complete search history.

(56) References Cited

U.S. PATENT DOCUMENTS

| 1,912,451 | A |   | 6/1933 | Hibbard |
|---|---|---|---|---|
| 3,856,077 | A | * | 12/1974 | Siegla ................................ 165/9 |
| 3,964,257 | A | * | 6/1976 | Lardellier .................... 60/226.1 |
| 4,030,290 | A | * | 6/1977 | Stachowiak ................. 60/226.2 |
| 4,111,257 | A | * | 9/1978 | Wiegard .............................. 165/9 |
| 4,137,711 | A | * | 2/1979 | Montgomery ............... 60/226.2 |
| 4,278,220 | A | * | 7/1981 | Johnston et al. .......... 244/110 B |
| 4,564,160 | A | * | 1/1986 | Vermilye .................. 244/110 B |
| 4,575,006 | A | * | 3/1986 | Madden .................... 239/265.29 |
| 4,922,712 | A | * | 5/1990 | Matta et al. .................. 60/226.2 |
| 5,372,006 | A | * | 12/1994 | Lair ............................. 60/226.2 |
| 5,495,710 | A | * | 3/1996 | Servanty ...................... 60/226.2 |
| 6,083,037 | A | * | 7/2000 | Gunther et al. ............... 439/443 |
| 6,237,325 | B1 | * | 5/2001 | Hogie et al. ................. 60/226.2 |
| 6,254,070 | B1 |   | 7/2001 | Runge |
| 6,820,410 | B2 | * | 11/2004 | Lair ............................... 60/204 |
| 2004/0187476 | A1 | * | 9/2004 | Lair ............................. 60/226.1 |

* cited by examiner

FOREIGN PATENT DOCUMENTS

| EP | 0321993 A2 | 6/1989 |
|---|---|---|
| EP | 1098106 A2 | 5/2001 |
| GB | 2320547 B | 6/1998 |

OTHER PUBLICATIONS

International Search Report PCT/FR2008/000844; Dated Dec. 4, 2008.

*Primary Examiner* — Gerald L Sung
(74) *Attorney, Agent, or Firm* — Brinks Hofer Gilson & Lione

(57) ABSTRACT

This leaf spring (17) for a thrust reverser shutter (13) is noteworthy in that it has two branches (19, 21) defining a U shape, the ends (19a, 19b, 21a, 21b) of these branches being able to cooperate respectively with a shutter (13) of said reverser and with a link (15) for actuating this shutter.

10 Claims, 2 Drawing Sheets

SPRING FOR A CASCADE-TYPE THRUST REVERSER SHUTTER FOR AN AIRCRAFT JET ENGINE

TECHNICAL FIELD

The present invention relates to a spring for a cascade-type thrust reverser shutter for an aircraft jet engine.

BACKGROUND

As is known per se, a cascade-type thrust reverser for an aircraft jet engine typically comprises a plurality of shutters secured to the sliding cowl of this reverser, collaborating with link rods connected to the inner fixed structure of the thrust reverser.

When the thrust reverser is operating in direct-jet mode, the shutters are kept by the link rods in the continuation of the internal wall of the sliding cowl.

When the thrust reverser is operating in reverse-jet mode, the shutters are actuated by the link rods to make them close off the cavity through which the secondary or bypass air of the jet flows, and thus divert the stream of secondary or bypass air forward, reversing the thrust and providing the aircraft fitted with such a reverser with additional braking.

It is known practice to fit springs between the link rods and the shutters, to compensate for differences in tolerances and structural deformations when the shutters are in the "direct jet" position, while at the same time allowing the link rods to apply sufficient pressure on these shutters in this position.

To date, various types of spring, either helical or leaf springs, have been used.

BRIEF SUMMARY

The disclosure provides a spring that is lighter in weight than those of the prior art.

Particularly, a leaf spring is provided for a thrust reverser shutter, characterized in that it has two branches defining a U-shape, the ends of these branches being able to collaborate respectively with one shutter of said reverser and with a link rod that actuates this shutter.

By virtue of this special shape, the ends of this spring are subjected to low or zero bending moments, which makes it possible to have a spring which, for a given mass, exhibits better elastic behavior.

According to other optional features of this spring:
said ends are positioned substantially facing one another: this special arrangement allows the two branches of the U to be worked over their entire length, and once again improves the elastic behavior of the spring for a given mass;
at least one of said branches comprises two parts in the form of a fork;
the branch of said spring which is intended to collaborate with said link rod has a cross section that decreases from the base of said U toward the end of this branch: because the bending moment to which this branch is subjected decreases from its end toward the base of the U, it will be appreciated that there is no real need for this branch to have the same cross section over its entire length. The mass of the spring can therefore be reduced;
the branch of said spring which is intended to collaborate with said link rod has, at its end, turned-over portions able to act as bearings for said link rod: these turned-over portions formed in the mass of the spring make it possible to avoid having additional components to form bearings, and therefore save weight;
the branch of said spring which is intended to collaborate with said shutter has mounting flats near its end;
this spring is at least partially formed of a titanium-based alloy: an alloy such as this saves weight;
this spring is at least partially formed of composite: this solution again saves weight.

The present invention also relates to a cascade-type thrust reverser notable in that it comprises at least one spring in accordance with the aforegoing.

The present invention also relates to a jet engine nacelle, notable in that it comprises a thrust reverser in accordance with the aforegoing.

BRIEF DESCRIPTION OF THE DRAWINGS

Other features and advantages of the present invention will become apparent from reading the description which will follow and from examining the attached figures, in which.

DETAILED DESCRIPTION

Figure 1:
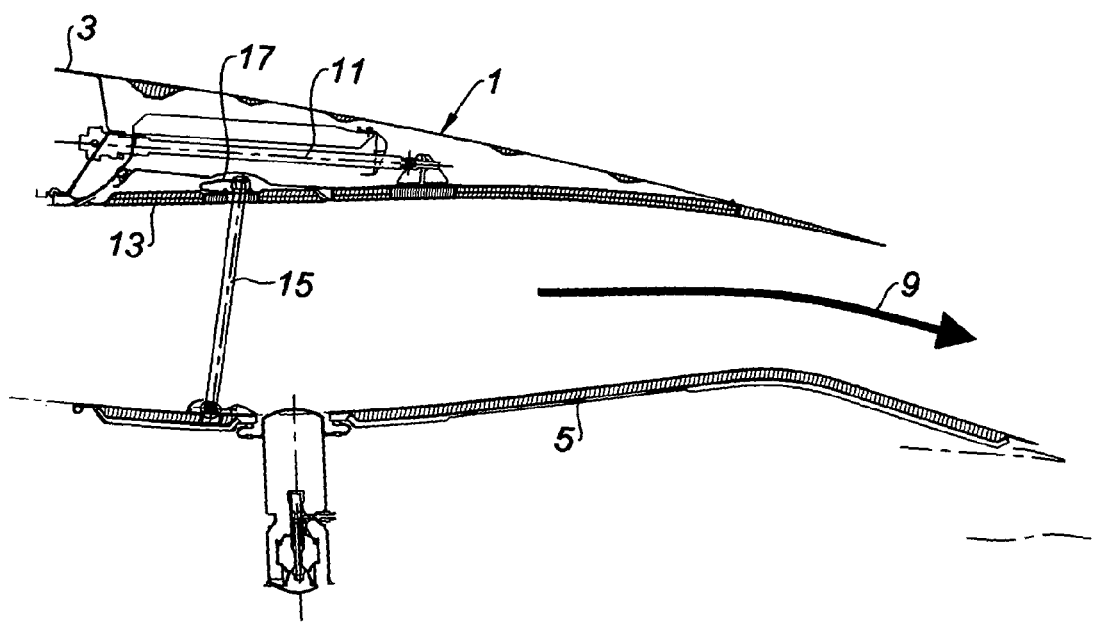
FIG. 1 is an axial cross section of a cascade-type thrust reverser equipped with at least one spring according to the invention, this reverser being depicted in the direct-jet position.

Reference is made to FIG. 1 which depicts a cascade-type thrust reverser typically comprising a cowl 1 mounted to slide with respect to a fixed structure, which structure comprises a forward fixed frame 3 and an inner fixed structure 5.

As is known per se, the sliding cowl and the inner fixed structure 5 between them define an annular cold air flow path 7.

In the normal mode of operation, that is to say in cruising flight, the cold air flows along inside this flow path 7 as indicated by the arrow 9 in FIG. 1, that is to say along the interior wall of the cowl 1 and of the inner fixed structure 5.

In this mode of operation, this cold air 9 adds to the hot air leaving the jet engine (not depicted), thus contributing to the thrust of an aircraft (not depicted).

Figure 2:
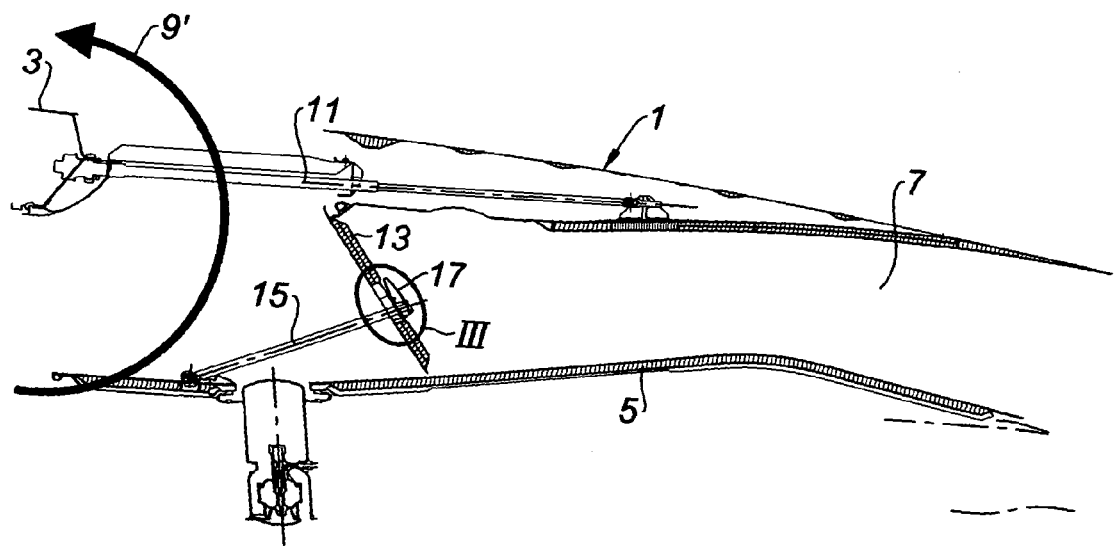
FIG. 2 is a view similar to FIG. 1, the reverser being depicted in the reverse-jet position.

In thrust-reversal mode (see FIG. 2), the sliding cowl 1 moves toward the rear of the jet engine, that is to say to the right in FIG. 2, under the effect of an actuator such as a hydraulic actuating cylinder 11.

This sliding has the effect of causing the annular flow path 7 to be blocked off by a plurality of shutters 13 distributed all around this flow path, just one of these being visible in FIGS. 1 and 2, and of redirecting the cold air flow toward the front of the nacelle (see arrow 9' in FIG. 2).

Each shutter 13 is mounted in an articulated manner on the sliding cowl 1, and its movement from the position visible in FIG. 1, in which it lies in the continuation of the internal wall of the sliding cowl 1, toward its shut-off position visible in FIG. 2, in which it lies across the cold air flow path 7, is obtained under the action of a link rod 15, the ends of which are pivot-mounted on the inner fixed structure 5 and on the shutter 13, respectively.

Figure 3:
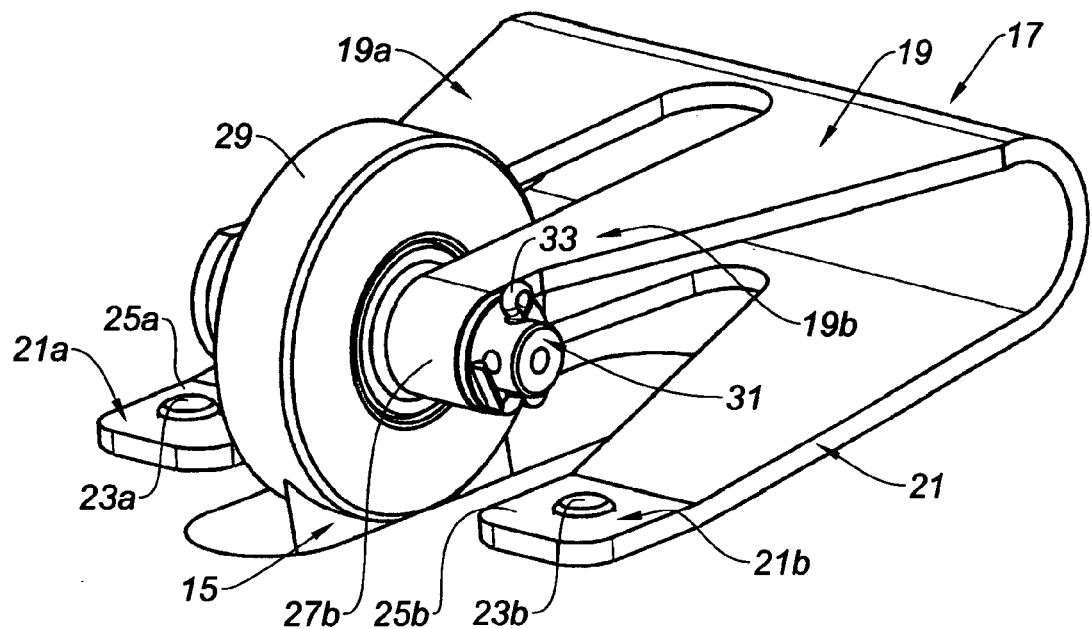
FIG. 3 is a perspective view of the region III indicated in FIG. 2.
Figure 4:
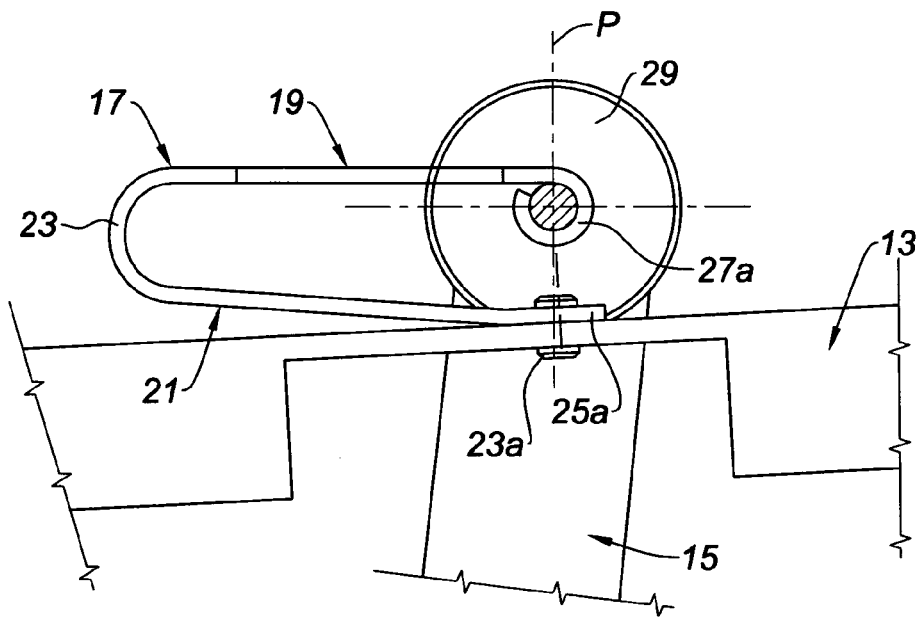
FIG. 4 depicts this region III in a view similar to that of FIGS. 1 and 2.

More specifically, and as can be seen in FIGS. 3 and 4, the link rod 15 collaborates with the shutter 13 via a spring 17.

This spring is U-shaped overall, that is to say comprises two branches 19, 21 connected to one another by a curved part 23.

Each of these two branches in fact has a forked end, that is to say an end comprising two parts, 19a, 19b and 21a, 21b, respectively.

The parts 21a, 21b of the branch 21 are fixed at their respective ends to the shutter 13 by appropriate means such as rivets 23a, 23b.

For preference, as can be seen in FIGS. 3 and 4, each part 21a, 21b of the branch 21 has, at its end, a respective mounting flat 25a, 25b, that is to say a part set at a small angle to the rest of the branch 21.

The two parts 19a, 19b of the branch 19 preferably have a shape that tapers from the curved part 23 of the spring toward the end of the branch 19.

Each of these parts 19a, 19b has, at its end, a turned-over portion 27b formed as an integral part of the remainder of the spring 17, and defining a bearing for one end 29 of the link rod 15.

For this purpose, a spindle 31 extends between the two turned-over portions 27a, 27b and through the end 29 of the link rod 15, it being possible for this spindle to be held in place using pins 33.

As is particularly visible in FIG. 4, it will be noted that the ends of the branch 19 and of the branch 21, collaborating with the link rod 15 and with the shutter 13, are preferably situated opposite one another, that is to say substantially in a plane P containing these ends and perpendicular to the shutter 13.

Advantageously, the spring 17 may be at least partially formed of a titanium alloy and/or of a composite material.

The table below shows that very good spring performance can be obtained, particularly with an alloy of the TV866 titanium alloy type, or with composite materials of the woven UD glass/epoxy or woven UD carbon/epoxy type.

In this table Δ indicates the permissible fatigue stress of the material, E indicates the elastic modulus of the material, the Energy is equal to $\Delta^2/E$, the Density indicates the density of the material, and the Performance is defined as the ratio between the Energy and the Density.

choice of the material of which it is made allow an excellent compromise to be reached between spring performance and the weight saving it is able to afford.

By way of indication, such a spring makes it possible to save 150 g by comparison with a spring of the prior art.

In the knowledge that there are twelve or so springs such as this fitted to a cascade-type thrust reverser, it then becomes possible to save 1800 g per thrust reverser.

Now, as is well known in aeronautical engineering, the weight penalty for 1 g is set at $1.

In this particular instance, the saving that can be had through the spring of the invention is therefore evaluated at $1800 per thrust reverser.

Assuming that the spring is made of titanium, a material that is slightly more expensive than traditional materials, the saving would reduce to approximately $1500 per reverser.

Of course, the present invention is not in any way restricted to the embodiment described and depicted, which was provided solely by way of example.

The invention claimed is:

1. A leaf spring for a thrust reverser shutter, comprising: at least one shutter; two branches defining a U-shape, wherein one of the respective ends of the branches is fixed to said at least one shutter of a thrust reverser and the other respective ends of the other branch has turned-over portions defining a bearing for one end of a link rod that actuates the shutter.

2. The leaf spring as claimed in claim 1, wherein said ends are positioned substantially facing one another.

3. The leaf spring as claimed in claim 1, wherein at least one of said branches comprises two parts in a form of a fork.

4. The leaf spring as claimed in claim 1, wherein the branch of said leaf spring having the turned-over portions has a cross section that decreases from a base of said U-shape toward an end of the branch having the turned-over portions.

5. The leaf spring as claimed in claim 1, wherein the turned-over portions of said branch having the turned-over-portions are able to act as bearing for said link rod.

|  | Spring steel | Titanium alloy TAD4E | Titanium alloy TV866 | Aluminum alloy A28GV | Woven UD glass/ epoxy | Woven UD Kevlar/ epoxy | Woven UD carbon/ epoxy |
|---|---|---|---|---|---|---|---|
| Δ (Mpa) | 1200 | 1200 | 1400 | 500 | 800 | 500 | 1100 |
| E (Mpa) | 205000 | 116000 | 106000 | 70000 | 45000 | 85000 | 13000 |
| Energy | 7.02 | 12.4 | 18.5 | 3.57 | 14.22 | 2.94 | 9.30 |
| Density | 8 | 4.5 | 4.5 | 2.72 | 2.5 | 1.6 | 1.8 |
| Performance | 0.9 | 2.8 | 4.1 | 1.3 | 5.7 | 1.8 | 5.2 |

The spring described hereinabove is able to compensate for differences in tolerances and structural deformations when the shutter 13 is in the "direct jet" position, that is to say is in the position depicted in FIG. 1, in which this shutter has to fit into a housing of predetermined size, defined on the one hand by the sliding cowl 1, and on the other hand by the forward frame 3.

While at the same time providing this compensation for tolerances, the spring 17 allows the link rod 15 to apply sufficient pressure on the shutter 13 to keep it in its position depicted in FIG. 1.

As indicated hereinabove, the U-shape of the spring, the fact that its two branches are positioned facing one another, the tapering cross sections of these two branches and the 6. The leaf spring as claimed in claim 1, wherein the branch of said spring fixed to said shutter has mounting flats near the end.

7. The leaf spring as claimed in claim 1, wherein the leaf spring is at least partially formed of a titanium-based alloy.

8. The leaf spring as claimed in claim 1, wherein the leaf spring is at least partially formed of a composite material.

9. A cascade-type thrust reverser, comprising at least one leaf spring as claimed in claim 1.

10. A jet engine nacelle, comprising a thrust reverser as claimed in claim 9.

* * * * *